United States Patent [19]

Kawata et al.

[11] Patent Number: 4,646,861
[45] Date of Patent: Mar. 3, 1987

[54] CONTROL DEVICE FOR VEHICLE SPEED

[75] Inventors: Shoji Kawata; Hitoshi Hyodo, both of Okazaki, Japan

[73] Assignees: Aisin Seiki Kabushikikaisha; Kabushikikaisha Shinsangyokaihatsu, both of Japan

[21] Appl. No.: 647,558

[22] Filed: Sep. 5, 1984

[30] Foreign Application Priority Data

Sep. 6, 1983 [JP] Japan .................................. 58-162600

[51] Int. Cl.$^4$ ............................................. B60K 31/00
[52] U.S. Cl. ................................. 180/176; 180/179; 364/426
[58] Field of Search ............... 180/175, 176, 177, 178, 180/179, 170; 364/426

[56] References Cited

U.S. PATENT DOCUMENTS

4,335,799 6/1982 Shields .................................. 180/175
4,352,403 10/1982 Burney .................................. 180/176

Primary Examiner—David M. Mitchell
Attorney, Agent, or Firm—Sughrue, Mion, Zinn, Macpeak and Seas

[57] ABSTRACT

When the device is not in use, supply of power to a computer CPU for controlling the device is automatically interrupted, thus prolonging the service life of the CPU and eliminating useless power consumption. The need of manual operation of a power-on switch can be dispensed with. When at least one of a set switch and a resume switch is actuated, supply of power to the CPU is automatically turned ON using a flip-flop circuit. If the vehicle speed is memorized during an ON state, the CPU is still held in an ON state. But if the vehicle speed is cleared, the CPU controls the flip-flop to set OFF supply of power. In case the vehicle speed is less than a given value, the memorized vehicle speed is cleared irrespective of the state of the set switch and the resume switch.

8 Claims, 8 Drawing Figures

CONTROL DEVICE FOR VEHICLE SPEED

BACKGROUND OF THE INVENTION

The present invention relates to a control device for vehicle speed which is adapted to automatically maintain a vehicle at the memorized vehicle speed, and more particularly to a control device for vehicle speed which is adapted to interrupt supply of power to an electronical control means for controlling the vehicle speed control device when it is not in use.

The control device for vehicle speed of this kind generally comprises a throttle driving means coupled to a throttle valve, a set switch means for memorizing a vehicle speed, a resume switch means for reading a vehicle speed, a vehicle speed detecting means, a vehicle speed memory, and an electronical control means which responses to actuation of the set switch means to store in the vehicle speed memory the value in accordance with an output signal from the vehicle speed detecting means at that time, which responses to the resume switch means to read out the content of the vehicle speed memory, and which controls the throttle driving means in accordance with the read-out content. When the set switch is held ON over a certain time during running of the vehicle, the running vehicle speed at that time is memorized and constant-speed control is started. Vehicle speed control is inhibited by a cancel signal from a brake switch or clutch switch, and actuation of the resume switch regenerates the memorized vehicle speed to effect constant-speed control again.

In the usual control device for vehicle speed of this kind, however, once a power switch is turned ON, power is always supplied to the electronical control device even if the driver has no intention of using the vehicle speed control device, so that useless power is consumed. In case the electronical control device comprises a microcomputer CPU, etc., the CPU executes the program at all times, so that the actual service life of the CPU is shortened. To avoid the above disadvantages, the driver himself may turn OFF the power switch of the vehicle speed control device when it is not in use. But such manual ON/OFF operation of the power switch is very troublesome.

SUMMARY OF THE INVENTION

It is an object of the present invention to eliminate the foregoing manual ON/OFF operation of the power switch by automatically cutting off the power supply of a control device for vehicle speed when it is not in use.

To achieve the above object, the present invention is featured in that a power supply control means is interposed in a power source line for supplying power to an electronical control means, thereby to automatically interrupt supply of power to the electronical control means when given conditions are not satisfied.

The power supply control switch means may include, for example, a filp-flop circuit having one input terminal to which are connected a set switch and a resume switch, and the other input terminal to which is connected one output port of the electronical control device, so that supply of power to the electronical control device is made ON/OFF in accordance with the state of an output terminal of the flip-flop.

More specifically, in case it is so arranged, for example, that power is supplied to the electronical control device with the output terminal of the flip-flop assuming a high level H and power is interrupted with the output terminal thereof assuming a low level L, the output terinal of the flip-flop is set to assume a high level H when the set switch or resume switch is turned ON. This causes power to be supplied to the electronical control device when either switch is actuated, i.e., when the control device for vehicle speed is used, so that the electronical control device is first operated at that time. If the vehicle speed is memorized at that time, this means subsequent use of the control device for vehicle speed and, therefore, the output terminal of the flip-flop remains unchanged. On the other hand, if no vehicle speed is memorized, a signal is sent from the electronical control device to the power supply control switch means to set the output terminal of the flip-flop at a low level L, as a result of which the power supply of the electronical control device is automatically cut off. When the vehicle speed is lower than a predetermined value, it may be so arranged that memorization of the vehicle speed is inhibited to cut off the power supply, even if the set switch is turned ON.

According to the present invention, in this way, there can be eliminated the need of manual ON/OFF operation of the power supply switch for each demand, and power is supplied to the electronical control device only when the vehicle speed is required to be memorized, regenerated and subjected to constant-speed control. Consequently, power consumption becomes less, reliability of the control device is improved and its service life is prolonged.

DESCRIPTION OF PREFERRED EMBODIMENTS

In the following preferred embodiments of the present invention will be described with reference to the accompanying drawings.

Figure 1:
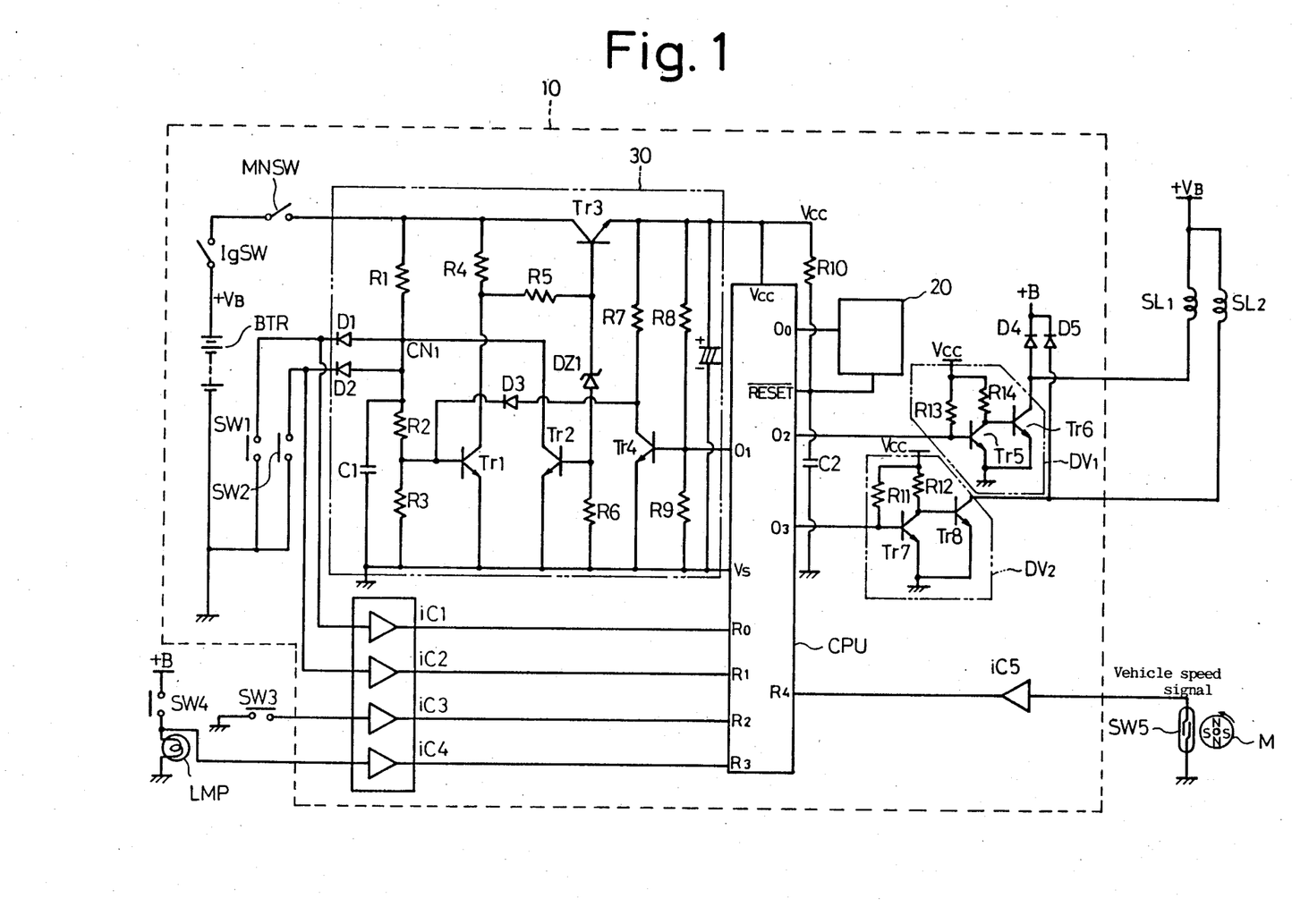
FIG. 1 is a circuit diagram showing an electrical circuit of a control device for vehicle speed according to one embodiment of the present invention.

FIG. 1 shows one embodiment of an electrical circuit of a control device for vehicle speed according to the present invention. In this embodiment, an electronical control device 10 mainly comprises of a single chip microcomputer CPU. The CPU has a reset port RESET to which is connected a runaway monitoring circuit 20, and input ports R0, R1, R2, R3 and R4 to which are connected a set switch SW1, resume switch SW2, clutch switch SW3, stop switch SW4 and a vehicle speed detecting reed switch SW5 through interface circuits ic1, ic2, ic3, ic4 and ic5, respectively.

A permanent magnet M connected to a speed meter cable (not shown) is arranged in the vicinity of the vehicle speed detecting reed switch SW5, and as the permanent magnet M is rotated with traveling of a vehicle, the contact of the reed switch SW5 is opened and closed correspondingly. When the contact of the reed switch SW5 is turned from ON to OFF, an output level of the interface circuit ic5 is changed and an interrupt demand is applied to the microcomputer CPU.

The clutch switch SW3 is opened and closed in interlock relation with a clutch pedal of the vehicle, and the stop switch SW4 is opened and closed in interlock relation with a brake pedal of the vehicle. A stop lamp LMP is connected to the stop switch SW4, so that the stop lamp is lit up with the switch SW4 being turned ON (closed).

The set switch SW1 and the resume switch SW2 are both press button switches and arranged on an instrument panel at positions convenient for the driver to operate them easily.

An output port 00 of the microcomputer CPU is connected to the runaway monitoring circuit 20, and output ports 02, 03 thereof are connected to a driving circuit DV1 which comprises transistors Tr5 and Tr6, and a driving circuit DV2 which comprises transistors Tr7 and Tr8, respectively. A control solenoid SL1 for controlling a negative pressure actuator (later described) is connected to an output of the driving circuit DV1, while a release solenoid SL2 is connected to an output of the driving circuit DV2.

A constant-voltage power supply 30 for the microcomputer functions to stabilize voltage of a battery BTR through an ignition switch IgSW and a main switch MNSW and then to apply constant voltage to a power source input terminal Vcc of the microcomputer. This power supply 30 comprises a stabilizing circuit which mainly consists of a Zener diode DZ1 and a transistor Tr3, and a switching circuit which consists of transistors Tr1, Tr2 and Tr4 and which is adapted to open and close the stabilizing circuit in response to output levels from the set switch SW1, the resume switch SW2 and the output port of the microcomputer.

The transistor Tr3 constituting the stabilizing circuit has the collector connected to the main switch and the emitter connected to the power source input port Vcc of the microcomputer CPU. The stabilizing circuit serves to hold constant the emitter output voltage of Tr3 by holding constant the base voltage of Tr3 through resistors R4, R5, the Zener diode DZ1 and a resistor R6.

The transistors Tr1 and Tr2 in the switching circuit constitute a flip-flop circuit, the transistor Tr1 serving to control the base voltage of the transistor Tr3 in accordance with an output level of the output port 01 of the microcomputer.

A resistor R1 is connected between the connection point CN1 and the main switch MNSW, diodes D1, D2 are connected between the connection point CN1 and the set switch SW1 and between the former and the resume switch SW2, respectively, and resistors R2, R3 as well as a capacitor C1 connected in series are connected between the connection point CN1 and the ground. The transistor Tr1 has the base connected to the connection point between the resistors R2 and R3, the emitter electrically grounded, and the collector connected to the connection point between the resistors R4 and R5. The transistor Tr2 has the collector connected to the connection point CN1, the base connected to the connection point between the Zener diode DZ1 and the resistor R6, and the emitter electrically grounded. The transistor Tr4 has the base connected to both the output port 01 of CPU and the connection point between resistors R8 and R9, the emitter electrically grounded, and the collector connected to the emitter of the transistor Tr3 through a resistor R7 and connected to the base of the transisor Tr1 through a diode D3.

Operation of the power supply circuit 30 thus arranged will be described hereinafter. When the ignition switch IgSW and the main switch MNSW are both turned ON, the base voltage of the transistor Tr2 rises faster than that of the transistor Tr1 because of the presence of the capacitor C1, so that the transistor Tr2 is conducted and the collector voltage of Tr2, i.e., the voltage at the connection point CN1, is held about 0V to turn OFF the transistor Tr1. Accoridngly, the constant voltage obtained by dividing the source voltage VB through the resistors R4, R5, the Zener diode DZ1 and the resistor R6, as previously noted, is applied to the base of the transistor Tr3, whereby the transistor Tr3 is conducted and a given voltage determined by the base voltage is output at the emitter. This applies the given voltage to the port Vcc of CPU, which in turn starts to execute the later-described program. At this time, the CPU judges the fact that any vehicle speed is not memorized in a read-write memory RAM incorporated in the CPU, and then sets the output port 01 at an output level of L. Upon this, since the transistor Tr4 is turned OFF, the collector voltage of Tr3 is divided through the resistors R7, R8 and then applied to the base of the transistor Tr1 through the diode D3. This changes the transistor Tr1 from an OFF state to an ON sate causing the connection point between the resistors R4 and R5 to be grounded, so that the base voltage of the transistor Tr3 becomes 0 and the transistor Tr3 is turned OFF, as a result of which the input voltage Vcc for CPU is now turned to 0. On this occasion, the transistor Tr2 is turned OFF.

Subsequently, the voltage obtained by dividing the source voltage through the resistors R1, R2 and R3 are applied to the base of the transistor Tr2 to maintain the above state, so that the CPU remains stopped in its operation.

Next, when either set switch SW1 or resume switch SW2 is pressed, the connection point CN1 is grounded through the diode D1 or D2, so that the transistor Tr1 is turned OFF causing both the transistors Tr3 and Tr2 to be conducted. This applies the given voltage to the port Vcc of CPU, which in turn starts to execute the program. During execution of the program, if the vehicle speed falls below a range where traveling at a constant speed is possible (e.g., 40 to 200 km/h), namely, if it is below the lower limit vehicle speed (e.g., 40 km/h), the output port 01 is made to assume an output level of L, whereby the transistor Tr4 is turned OFF and the transistor Tr1 is turned ON, as previously noted, causing the voltage Vcc to be 0V. As a result, operation of the CPU is stopped.

Figure 2:
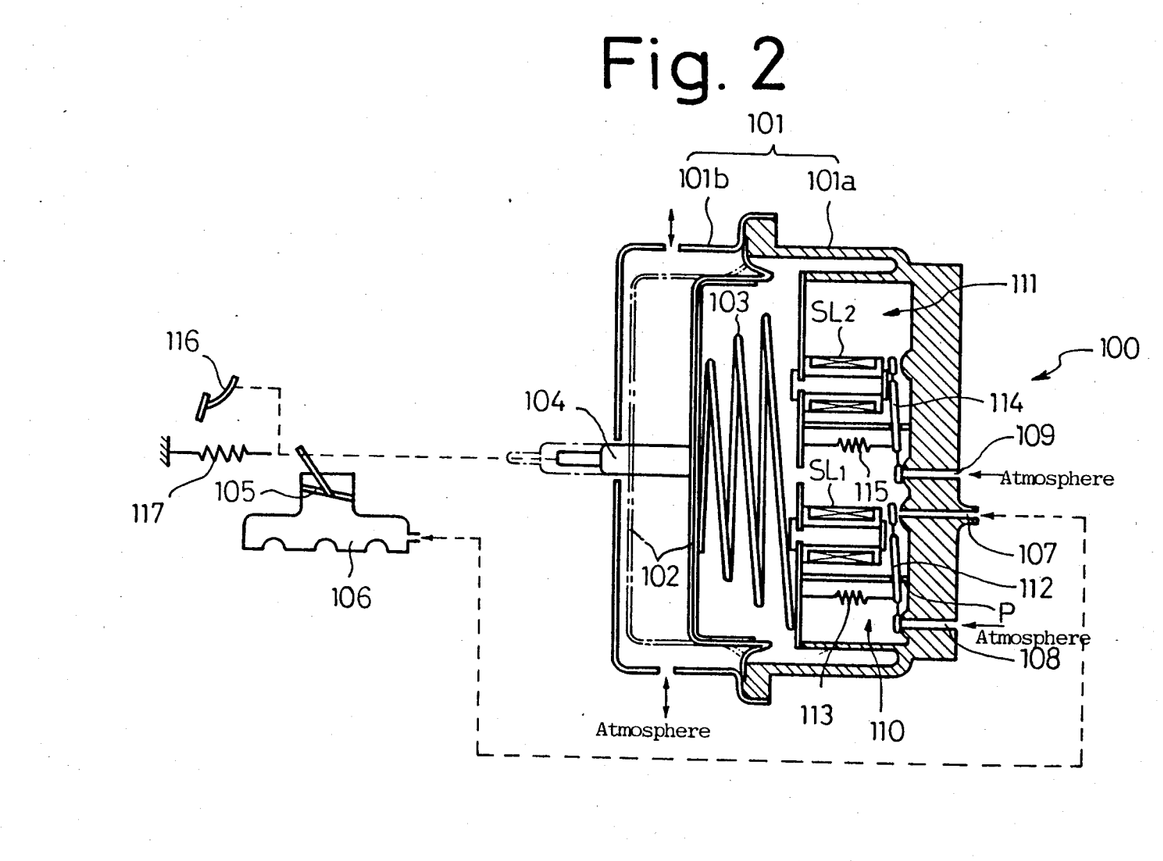
FIG. 2 is a sectional view showing an actuator of the control device for vehicle speed in FIG. 1.

FIG. 2 shows the construction of a negative pressure actuator 100 to be controlled by the electrical circuit of FIG. 1. Description will be made by referring to FIG. 2. A housing 101 is composed of two sections 101a and 101b. A diaphragm 102 is held between the flanged parts of these two sections 101a and 101b. A space defined by the diaphragm 102 and the housing section 101a serves as a negative pressure chamber, while a space defined by the diaphragm 102 and the housing section 101b is in communication with the atmosphere. Designated at 103 is a compression coil spring interposed between the housing section 101a and the diaphragm 102, the spring pushing back the diaphragm 102 to a position indicated by phantom lines when the pressure within the negative pressure chamber is near the atmospheric pressure. A projection 104 fixed to the diaphragm in a position near its center is operatively connected to a link of the throttle valve 105. The housing section 101a is provided with a negative pressure intake port 107 in communication with an intake manifold 106 and also atmosphere intake ports 108, 109.

Designated at 110 is a negative pressure control valve and at 111 is a negative pressure release valve, both valves being fixed to the housing section 101a. A movable piece 112 of the negative pressure control valve 110 is capable of tilting about a point P, and it has one end connected to an extension coil spring 113 and the other end facing the control solenoid SL1. Both ends of the movable piece 112 function as valve bodies, which are operated in accordance with energization/deenergization of the solenoid SL1 coming into either state where the negative pressure intake port 107 is opened and the atmosphere intake port 108 is closed (i.e., the state illustrated) or state where the negative pressure intake port 107 is closed and the atmosphere intake port 108 is opened.

The negative pressure release valve 111 includes a movable piece 114, an extension coil spring 115 and a solenoid SL2 similarly to the control valve 110, the movable piece 114 functioning to close the atmosphere intake port 109 (corresponding to the state illustrated) or open the same. Incidentally, designated at 116 is an accelerator pedal and at 117 is an extension coil spring.

FIGS. 3 to 7 show operation flows for vehicle speed control to be executed by the microcomputer CPU of FIG. 1. Operation of the CPU will now be described in sequence with reference to these figures.

Figure 3:
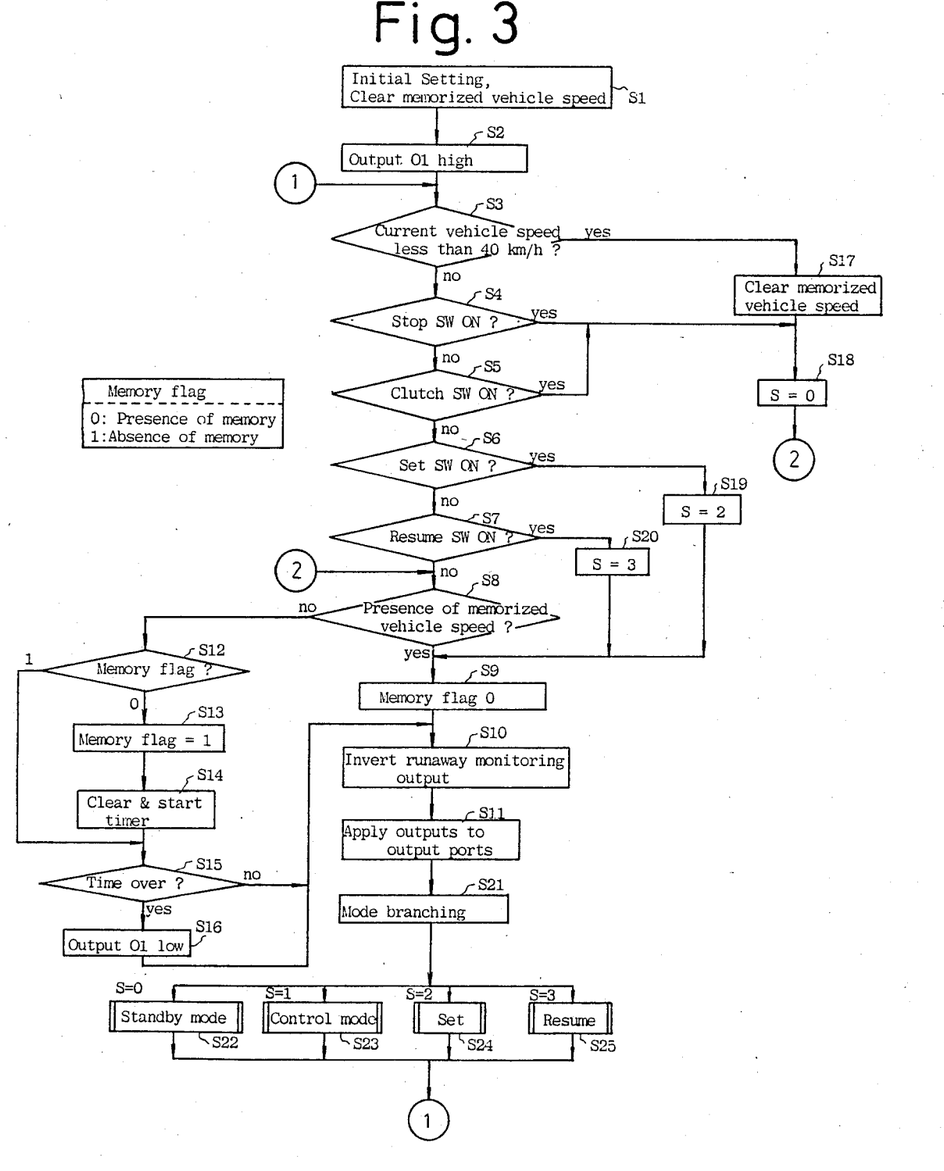
FIGS. 3, 4, 5, 6 and 7 are flow charts showing operation of a microcomputer CPU in FIG. 1.

When powered on, initial setting is first carried out. That is, the output ports are set at respective initial levels and the content of the memory is cleared (S1).

Next, the CPU makes an output level of the output port 01 high (S2) and reads levels of the input ports R4, R3, R2, R0 and R1 for judging operations of the respective switches so as to perform processings in accordance with the judged operation states. More specifically, it is first judged (S3) whether or not the vehicle speed is less than a given speed, e.g., 40 km/h, based on an input to the input port R4. If the vehicle speed is less than the given speed, the memorized vehicle speed is cleared (S17) and a status register S is then set at zero, i.e., in a cancelled state. On the other hand, if the vehicle speed is above the given value, it is judged in a step S4 whether or not the stop switch SW4 is turned ON, namely, the brake is trod on, and it is then judged in a step S5 whether the clutch switch SW3 is turned ON. In case of YES in the steps S4 and S5, the status register is brought into a cancelled state, i.e., S=0 (S18).

In case of NO in both steps, it is judged in steps S6 and S7 whether or not the set switch SW1 and the resume switch SW2 are turned ON, respectively. In case of YES in the steps S6 and S7, the status register S is set at 2 (corresponding to a transition state from the storage mode to the constant-speed control mode S=1) and at 3 (corresponding to a transition state from the resume mode S=3 to the constant-speed control mode S=1) in steps S19 and S20, respectively.

With both switches SW1 and SW2 being not turned ON, it is judged whether or not any vehicle speed is memorized in the read-write RAM of CPU (S8). In case of NO, it is judged in a step S12 whether a memory flag is 1 or 0. If the memory flag is 0 (0 indicates the presence of memory), the memory flag is made to become 1 (S13) and then a timer is started after clearing the same (S14). It is judged in a step S15 whether or not time is over. In case of YES, the output port 01 is turned to an L level (S10). With this, as previously stated, the transistor Tr4 is turned OFF causing TR1 to be turned ON and both Tr3 and Tr2 to be turned OFF, so that the source voltage Vcc for the CPU becomes zero.

If the step S16 is completed, if time is not over in the step S15, or if the memory flag is set at 0 in the step S9, an output level of the runaway monitoring output port 00 is inverted in a step S10. In other words, when the port 00 was set at a high level H, the level is now set at a low level L, while when the port 00 was set at a low level L, the level is now set at a high level H. It is arranged that the above processing is always executed at least once within a certain time with the CPU being under normal operation, whereby a pulse signal of substantially constant period is applied to the runaway monitoring circuit 20 from the CPU. Every time the pulse signal is applied, the circuit 20 turns the $\overline{\text{RESET}}$ terminal of CPU to an L level. However, in the event the CPU comes into runaway and there produces no pulse at the port 00, the circuit 20 turns the $\overline{\text{RESET}}$ terminal of CPU to an H level. This causes the CPU to undergo the same operation as that when powered off, so that runaway of the CPU is surely stopped.

Next, after applying outputs to the outputs ports 02, 03 in a step S11, the flow is branched in a step S21 to any one of subroutines S22 to S25 shown in FIGS. 4 to 7 in accordance with the content of the status register S. After passing one of the subroutines, the flow returns back to the step S3 as shown in ①→①, so that the program is circulated in the form of a loop.

Figure 4:
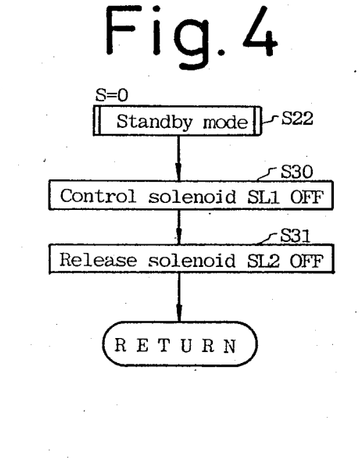
Figure 5:
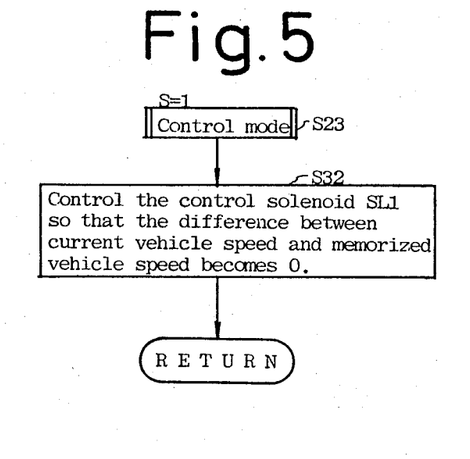

Coming into the standby mode (S=0) routine S22 shown in FIG. 4, the control solenoid L1 is turned OFF in a step S30. More specifically, the output port 02 assumes an H level causing Tr5 to be turned ON and Tr6 to be turned OFF, so that the collector current of Tr6, i.e., current passing through the solenoid SL1, is interrupted. Next, the release solenoid SL2 is also turned OFF in a step S31. More specifically, the output port 03 of CPU assumes an H level causing Tr7 to be turned ON and Tr8 to be turned OFF, so that no current passes the solenoid SL2. Accordingly, the atmosphere intake ports 107, 109 of the actuator 100 shown in FIG. 2 are both opened to introduce air in the negative pressure chamber, whereby the diaphragm 102 is pushed back to the position as shown by phantom lines. As a result, constant-speed control is not performed. When the program proceeds to a control mode (S=1) subroutine S23 as shown in FIG. 5, the control solenoid SL1 is controlled in a step S32 so that the difference between the current vehicle speed and the memorized vehicle speed becomes 0. This control is carried out by adjusting the duty ratio of the pulse issued to the output port 02.

Figure 6:
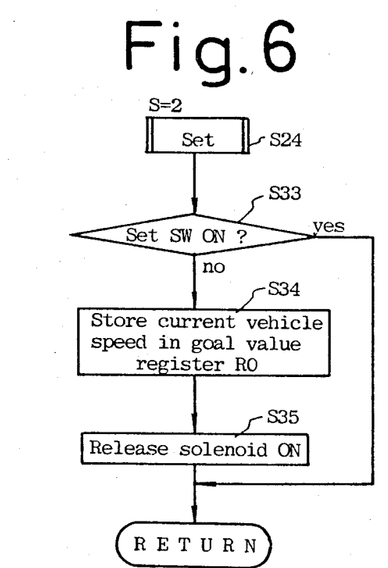

When the set (S=2) subroutine S24 as shown in FIG. 6 is selected, it is judged in a step S33 whether the set switch is turned ON. In case of NO, i.e., in the state where the set switch is released after being once pressed, the current vehicle speed is stored in a target value register Ro in the CPU, and the release solenoid SL2 is then turned ON in a step S35, whereupon the negative pressure chamber of the actuator is disconnected from the atmosphere.

Figure 7:
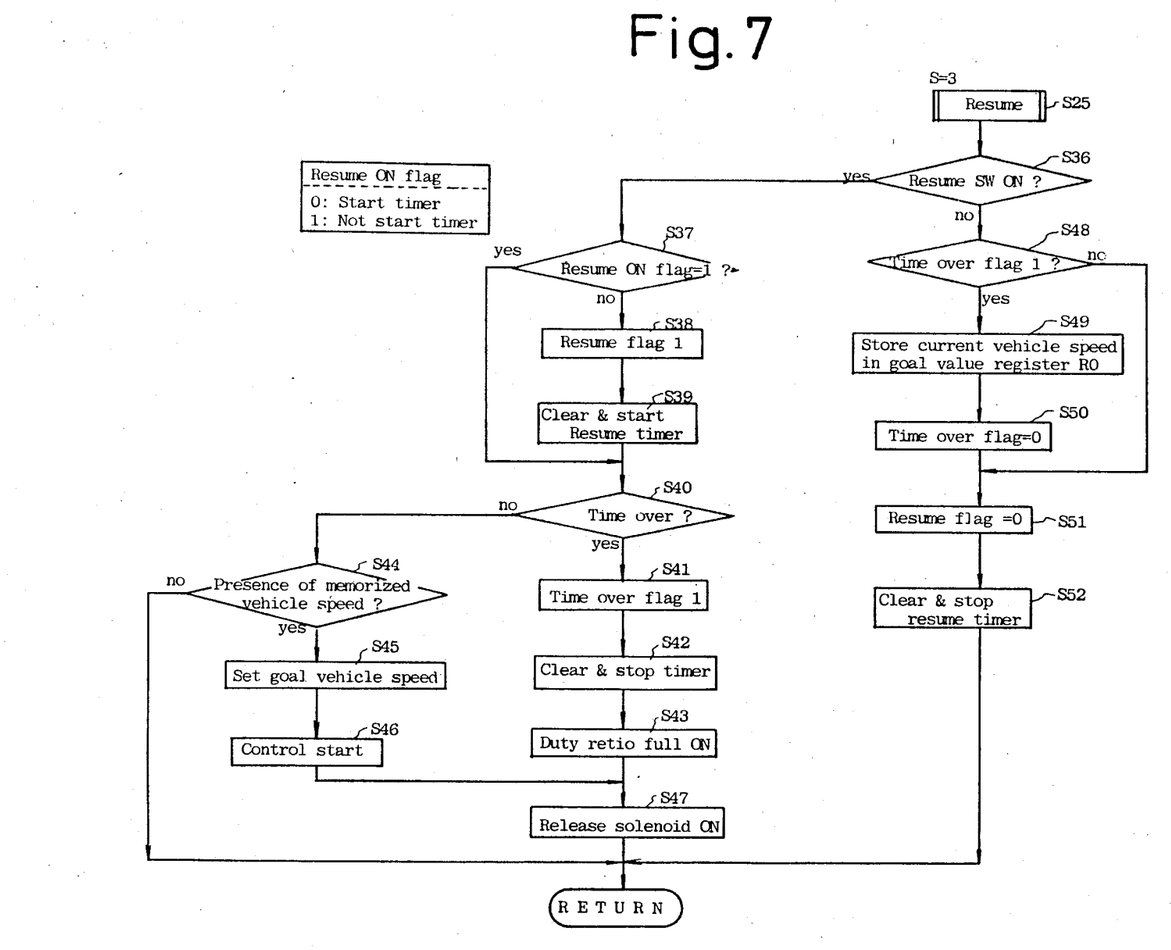

The resume mode (S=3) subroutine S25 shown in FIG. 7 will now be described. Coming into this subroutine, it is judged in a step S36 whether or not the resume switch is turned ON. In case of YES, i.e., when the resume switch is pressed, the program proceeds to a step S37 where it is judged whether or not the resume ON flag is 1. If the resume ON flag is not 1, the resume flag is turned to 1 in a step S38, and a resume timer is cleared and then restarted in a step S39. If time is over (S40), a time-over flag is set at 1 (S41) and the timer is cleared and then stopped (S42). Thereafter, the duty ratio is adjusted to be full ON in a step S43 so as to turn ON the control solenoid for acceleration.

If time is not over in the step S40, it is judged in a step S44 whether or not the memorized vehicle speed is present. In case of YES, the goal vehicle speed is set in a step S45 and constant-speed control is started in accordance with the set vehicle speed (S46). When the memorized vehicle speed is absent in the step S44, i.e., when there exists no vehicle speed with the resume switch being pressed, the flow is returned back to the step S16 where the power supply is turned OFF.

After the step S43 or S46, the release solenoid is turned ON (S47) so that the negative pressure chamber is now disconnected from the atmosphere.

Next, if the resume switch is not turned ON in the step S36, i.e., if the resume switch is in a released state, it is judged in a step S48 whether or not the time-over flag is 1, namely, whether or not it was in an accelerated state. In case of YES, the current vehicle speed is stored in the target value register Ro (S49) and the time-over flag is set at 0 (S50) for stop of acceleration, thereby starting constant-speed control at that vehicle speed. After that, the resume flag is set at 0, i.e., it comes into such a state that the resume switch is in a released state, whereby the resume timer is cleared and then stopped (S52).

Figure 8:
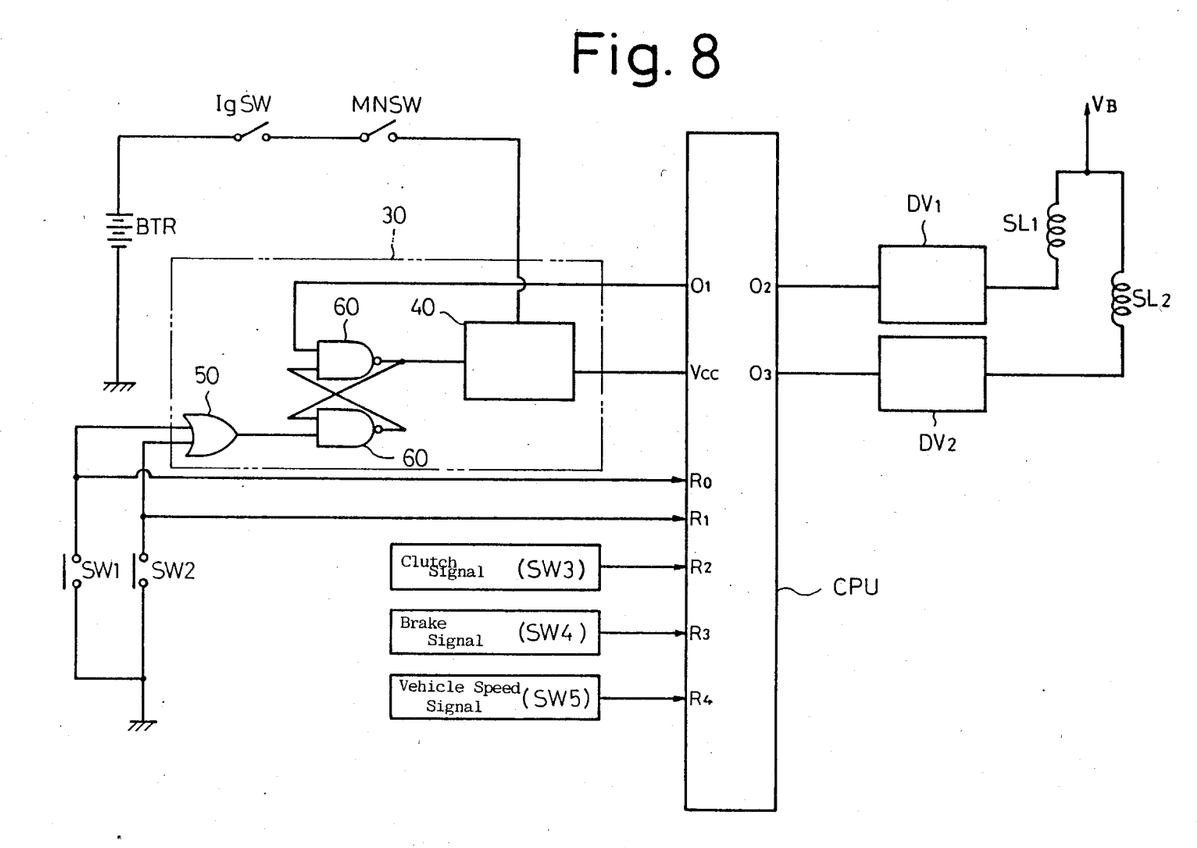
FIG. 8 is a block diagram showing a modified embodiment of the electrical circuit in FIG. 1.

A block diagram of FIG. 8 illustrates the basic configuration of the present invention in a more generalized form of the speed control device as shown in FIG. 1. A switching circuit in the constant-voltage power supply 30 of the speed control device comprises an OR circuit 50 whose inputs are connected to the set switch SW1 and the resume switch SW2, and a flip-flop consisting of two NAND circuits 60 one of which has an input connected to an output of the OR circuit and the other of which has an input connected to the output port 01 of CPU. The output of a stabilizing circuit 40 is switched in accordance with the output of the flip-flop.

In the CPU of this device, the same program as that in the device of FIG. 1 is executed. Stated differently, upon actuation of the set switch and the resume switch the source voltage is applied to the CPU, if within a range of a given speed, to permit memorization of the vehicle speed and constant-speed control, and when the speed is memorized, constant-speed control can be performed. When the memorized speed is not present upon pressing of the resume switch, supply of the source voltage to the CPU is stopped.

What we claim is:

1. In a control device for vehicle speed comprising:
   a throttle driving means operatively coupled to a throttle valve of a vehicle;
   a set switch means for commanding memorization of the vehicle speed;
   a resume switch means for commanding read of the vehicle speed;
   a vehicle speed detecting means for generating a signal in accordance with the vehicle speed;
   a vehicle speed memory;
   an electronical control means for memorizing in said vehicle speed memory vehicle speed information corresponding to the signal obtained from said vehicle speed detecting means in response to actuation of said set switch means, and for reading out the content of said vehicle speed memory in response to actuation of said resume switch means to control said throttle driving means in accordance with the read-out content;
   a power supply means for supplying power to said electronical control means; and
   a power supply control switch means for controlling supply of power to said electronical control means in response to the state of at least one of said set switch means and said resume switch means and the state of said electronical control means wherein the improvement comprises said electronical control means sets said power supply control switch means into such a state that supply of power to said electronical control means is turned OFF, when vehicle speed information is not memorized in said vehicle speed memory.

2. A control device for vehicle speed according to claim 1, wherein said power supply control switch means includes a flip-flop circuit and a power feeding control switch means adapted to control power feeding in accordance with the state of an output terminal of said flip-flop circuit.

3. A control device for vehicle speed according to claim 1, wherein said power supply control switch means turns ON supply of power to said electronical control means, when either said set switch means or said resume switch means is actuated.

4. A control device for vehicle speed according to claim 1, wherein, when the vehicle speed is less than a given value, said electronical control means clears the content of said vehicle speed memory and sets said power supply control switch means into such a state that supply of power to said electronical control means is turned OFF.

5. A control device for vehicle speed comprising:
   a throttle driving means operatively coupled to a throttle valve of a vehicle;
   a set switch means for commanding memorization of the vehicle speed;
   a resume switch means for commanding read of the vehicle speed;
   a vehicle speed detecting means for generating a signal in accordance with the vehicle speed;
   a vehicle speed memory;
   an electronical control means for memorizing in said vehicle speed memory vehicle speed information corresponding to the signal obtained from said vehicle speed detecting means in response to actuation of said set switch means, and for reading out the content of said vehicle speed memory in response to actuation of said resume switch means to control said throttle driving means in accordance with the read-out content;
   a power supply means for supplying power to said electronical control means; and
   a power supply control switch means which includes a flip-flop circuit and a power feeding control switch means adapted to control power feeding in accordance with the state of an output terminal of said flip-flop circuit, which turns ON power feeding to said electronical control means when at least one of said set switch means and said resume switch means is actuated, and which turns OFF power feeding to said electronical control means when a given signal is applied thereto from said electronical control means.

6. A control device for vehicle speed according to claim 5, wherein said electronical control means sets said power supply control switch means into such a state that supply of power to said electronical control means is turned OFF, when vehicle speed information is not memorized in said vehicle speed memory.

7. A control device for vehicle speed according to claim 5, wherein, when the vehicle speed is less than a given value, said electronical control means clears the content of said vehicle speed memory and sets said power supply control switch means into such a state that supply of power to said electronical control means is turned OFF.

8. A control device for vehicle speed according to claim 5 wherein, when the vehicle speed is less than a given value, said electronical control means sets said power supply control switch means into such a state that the supply of power to said electronical control means is turned OFF.

* * * * *